US008960009B2

(12) United States Patent
Takahashi et al.

(10) Patent No.: US 8,960,009 B2
(45) Date of Patent: Feb. 24, 2015

(54) APPARATUS AND METHOD FOR MEASURING VIBRATION CHARACTERISTICS

(75) Inventors: Naohiko Takahashi, Tsuchiura (JP); Haruo Miura, Kasumigaura (JP); Kazutoshi Yanagihara, Tsuchiura (JP)

(73) Assignee: Hitachi, Ltd., Tokyo (JP)

( * ) Notice: Subject to any disclaimer, the term of this patent is extended or adjusted under 35 U.S.C. 154(b) by 387 days.

(21) Appl. No.: 13/456,258

(22) Filed: Apr. 26, 2012

(65) Prior Publication Data
US 2012/0272740 A1 Nov. 1, 2012

(30) Foreign Application Priority Data

Apr. 28, 2011 (JP) .................................. 2011-101422

(51) Int. Cl.
*G01H 1/00* (2006.01)

(52) U.S. Cl.
CPC ....................... *G01H 1/003* (2013.01)
USPC .......................................................... 73/660

(58) Field of Classification Search
USPC .................. 73/660.462, 662, 579, 114.07
See application file for complete search history.

(56) References Cited

U.S. PATENT DOCUMENTS

| 4,453,407 | A | * | 6/1984 | Sato et al. ........................ 73/462 |
| 4,643,023 | A | * | 2/1987 | Capps ........................ 73/114.07 |
| 5,365,787 | A | * | 11/1994 | Hernandez et al. ............. 73/660 |
| 5,553,501 | A | * | 9/1996 | Gaddis et al. ................... 73/662 |
| 5,717,141 | A | * | 2/1998 | Kikuchi et al. ................. 73/579 |
| 6,158,286 | A | * | 12/2000 | Nguyen et al. ................. 73/660 |
| 6,366,862 | B1 | * | 4/2002 | Qian et al. ........................ 702/35 |
| 8,267,652 | B2 | * | 9/2012 | Jolly et al. ......................... 416/1 |
| 8,772,992 | B2 | * | 7/2014 | Lee et al. ..................... 310/90.5 |

FOREIGN PATENT DOCUMENTS

| JP | 60-108728 | 6/1985 |
| JP | 5-288219 | 11/1993 |

(Continued)

OTHER PUBLICATIONS

Pettinato et al, "Shop Acceptance Testing of Compressor Rotodynamic Stability an Theoretical Correlation", Proceedings of the Thirty-ninth Turbomachinery Symposium, 2010, pp. 31-42.

(Continued)

*Primary Examiner* — J M Saint Surin
(74) *Attorney, Agent, or Firm* — Antonelli, Terry, Stout & Kraus, LLP.

(57) ABSTRACT

A vibration characteristic measuring apparatus includes a magnetic bearing that generates magnetic force on the rotating body of a multi-stage centrifugal compressor, a displacement sensor that measures the vibration amplitude of the rotating body, a current amplifier that supplies a current to the magnetic bearing, and an excitation controller which outputs an excitation control signal for applying vibration to the rotating body and which measures the response characteristics of the vibration of the rotating body to the excitation control signal. The excitation controller outputs a rotating body control signal obtained by adding a vibration eliminating signal for eliminating unbalance vibration of the rotating body to the excitation control signal when measuring the response characteristics, and the current amplifier supplies a current that generates magnetic force in accordance with the rotating body control signal to the magnetic bearing.

3 Claims, 6 Drawing Sheets

(56) References Cited

FOREIGN PATENT DOCUMENTS

| | | |
|---|---|---|
| JP | 2002-71532 | 3/2002 |
| JP | 2010-164186 | 7/2010 |

OTHER PUBLICATIONS

Office Action issued in Japanese Patent Application No. 2011-101422 on Jul. 22, 2014.

* cited by examiner

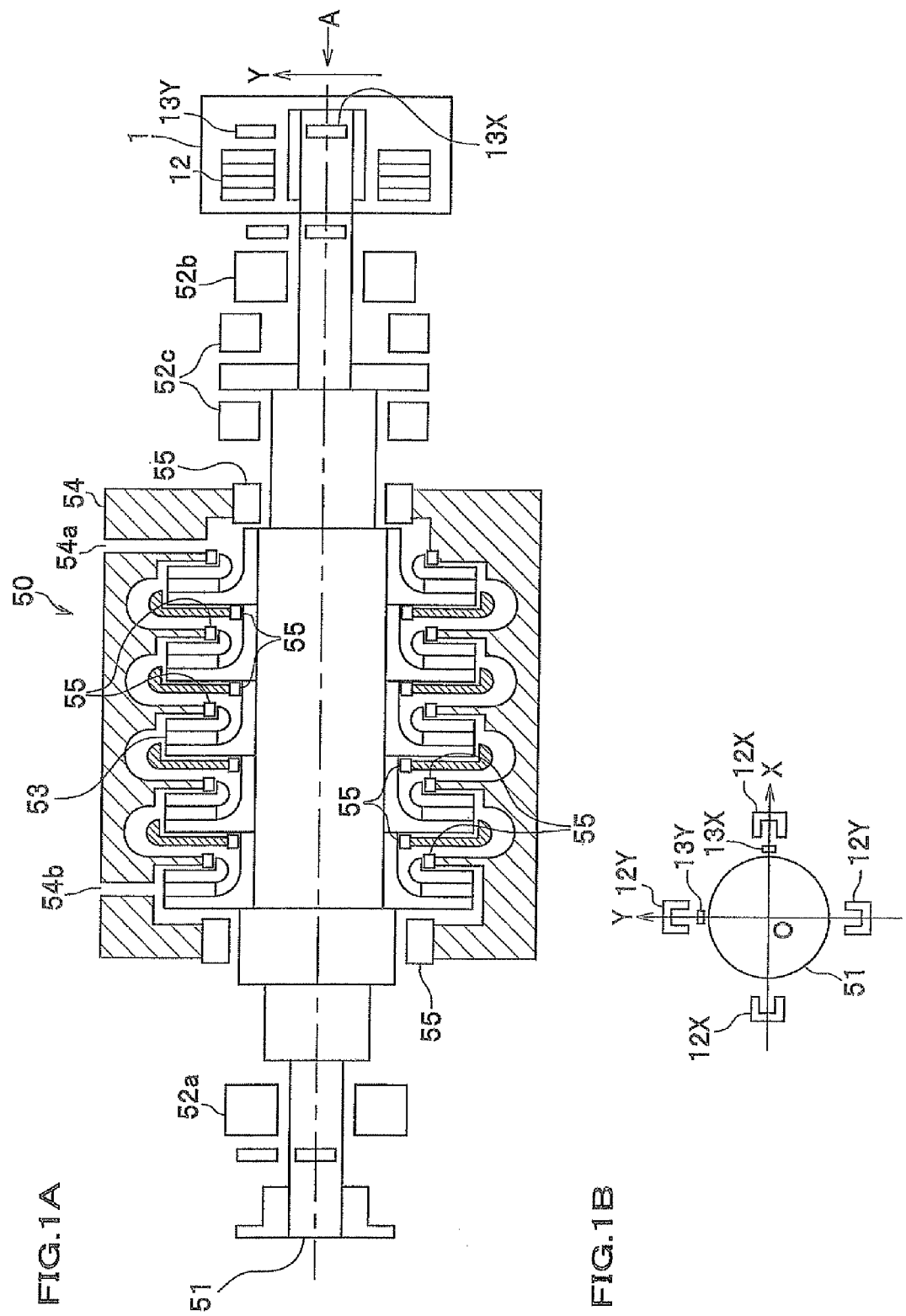

APPARATUS AND METHOD FOR MEASURING VIBRATION CHARACTERISTICS

CROSS REFERENCE TO RELATED APPLICATION

This application claims the priority of Japanese Application No. 2011-101422, filed on Apr. 28, 2011, the entire specification, claims and drawings of which are incorporated herewith by reference.

BACKGROUND OF THE INVENTION

1. Field of the Invention

The present invention relates to a vibration characteristic measuring apparatus that measures vibration characteristics of a rotational shaft of a rotating machine like a multi-stage centrifugal compressor and a vibration characteristic measuring method.

2. Description of the Related Art

A multi-stage centrifugal compressor, which is installed in a petroleum field, a natural gas plant, and a petrochemical plant, etc., and which compresses a compressible fluid, such as hydrocarbon or carbon dioxide gases, rotates centrifugal impellers of multi-stages along with a rotational shaft, and compresses the compressible fluid by centrifugal force.

Such a multi-stage centrifugal compressor is provided with a sealing mechanism that has an annular sealing member around the axial line of the rotational shaft so as to suppress the leak of the pressurized fluid from each stage of the centrifugal impeller.

According to the sealing mechanism of the multi-stage centrifugal compressor, the instability factor due to the leak and flow of the pressurized fluid occurs, which affects the stability of the rotational shaft and the centrifugal impeller. That is, when the instability factor exceeds the stability factor, self-induced vibration so-called seal whirl occurs.

That is, it is important to design the rotating machine so as to have larger stability sufficiently than instability generated at the sealing mechanism. In order to do so, it is necessary to measure the vibration characteristics of a rotating body including the rotational shaft to find out the characteristics thereof, and to evaluate the stability based on the measured vibration characteristics.

For example, JP H05-5057 B discloses a technique of applying a vibration to a bearing, and analyzing the vibration generated by a rotational shaft due to the former vibration, thereby measuring the vibration characteristics of a rotating machine in operation. Also, Pettinato, et al., "Shop Acceptance Testing of Compressor Rotordynamic Stability and Theoretical Correlation", $39^{th}$ Turbo Machinery Symposium, Texas, 2011, p.p. 31-42 discloses a technique of attaching an active radial magnetic bearing to an end of a rotational shaft of a compressor, supplying an excitation current to the magnetic bearing to apply vibration to the rotational shaft, thereby measuring the vibration characteristics of the rotational shaft.

The above-explained two techniques are to apply vibration to a rotating rotational shaft, measure the vibration (an amplitude and a phase) of the rotational shaft, thereby measuring the vibration characteristics of the rotational shaft.

When the vibration characteristics of a rotating body like the rotational shaft is measured in this manner, in order to obtain high-quality data with little variability, it is preferable that the amplitude of the applied vibration should be large. By increasing the vibration amplitude of the rotating body excited by the applied vibration, the S/N ratio of a signal output from a sensor measuring the vibration is improved, and thus high-quality data indicating the vibration characteristics can be obtained.

On the other hand, when the vibration amplitude of the rotating body is increased by the applied vibration, if it exceeds an allowable value set as a designed value, for example, the rotating body contacts the sealing mechanism, and the sealing member of the sealing mechanism is worn out. Hence, it is necessary to apply vibration within a range where the vibration amplitude of the rotating body does not exceed the allowable value.

However, the rotating body of the rotating machine is vibrated within a range where the vibration amplitude does not exceed the allowable value in the normal rotation due to an unbalanced weight, etc. Accordingly, the amplitude of the vibration that can be excited by applying vibration to the rotating body is restricted within the range of a margin from the amplitude of the vibration at the non-excited condition to the allowable value. In other words, the vibration excited by the applied vibration at the rotational shaft is restricted and small, and thus the S/N ratio of a signal output from the sensor measuring the vibration becomes poor. Hence, the quality of data (data indicating the vibration characteristics of the rotational shaft) obtained based on such a signal deteriorates.

For example, when the quality of obtained data is poor, vibration analysis can be made by largely increasing the number of data to be obtained and averaging those pieces of data.

However, when the large numbers of data are obtained for averaging, it takes a long time to obtain the large numbers of data and the number of process steps is increased. Also, the operation time of the rotating machine and the time for applying vibration become long in order to obtain the large numbers of data, resulting in the increase of energy consumption.

Therefore, it is an object of the present invention to provide an apparatus and a method for measuring vibration characteristics which can vibrate a rotating body without exceeding an allowable value when measuring vibration characteristics, and which can obtain high-quality data without increasing energy consumption.

SUMMARY OF THE INVENTION

In order to achieve the above object, an aspect of the present invention provides an apparatus for measuring vibration characteristics, including: a magnetic bearing that generates a magnetic force on a rotating body of a rotating machine in a non-contact manner; a measuring device that measures an vibration amplitude when the rotating body is vibrated; a current supplier that supplies a current to the magnetic bearing; and an excitation controller which outputs an excitation control signal for controlling the magnetic bearing to apply vibration to the rotating body, and which measures a response characteristics of the vibration of the rotating body to the excitation control signal based on the vibration measured by the measuring device. The excitation controller outputs a rotating body control signal obtained by adding a vibration eliminating signal to the excitation control signal for the magnetic bearing to eliminate unbalance vibration generated when the rotating body rotates when the response characteristics is measured, and the current supplier supplies a current that generates magnetic force in accordance with the rotating body control signal to the magnetic bearing. Also, the present invention provides a method for measuring vibration characteristics by the above-explained vibration characteristic measuring apparatus.

BRIEF DESCRIPTION OF THE DRAWINGS

FIG. 1A is a schematic configuration diagram showing a multi-stage centrifugal compressor provided with a vibration characteristic measuring apparatus according to an embodiment of the present invention as viewed from a side;

FIG. 1B is a schematic view showing a magnetic bearing of the vibration characteristic measuring apparatus and a rotational shaft of the multi-stage centrifugal compressor as viewed in a direction A;

DETAILED DESCRIPTION OF THE PREFERRED EMBODIMENT

Figure 2A:
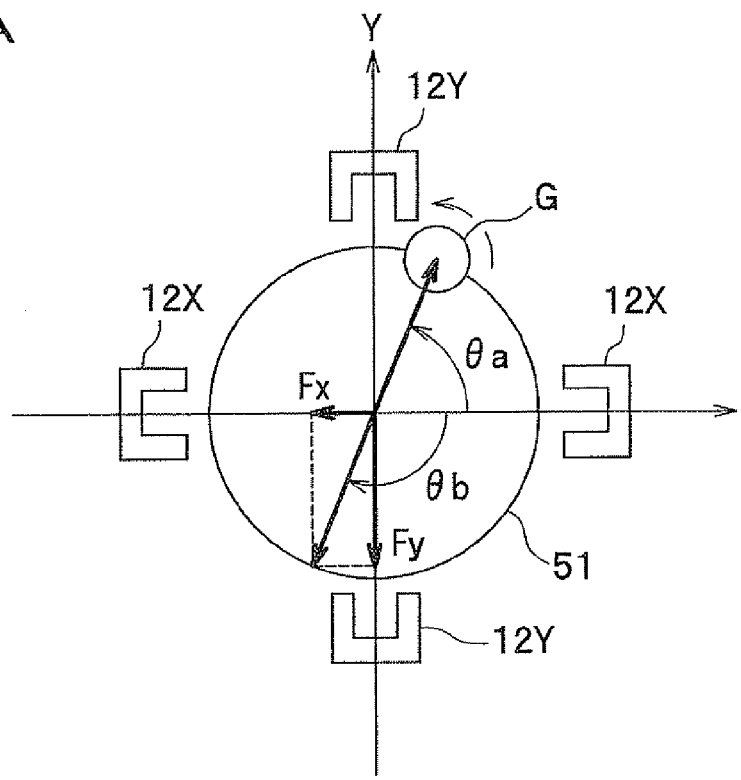
FIG. 2A is a diagram modeling unbalance vibration of the rotational shaft.

An embodiment of the present invention will be explained in detail with reference to the accompanying drawings.

As shown in FIG. 1A, a vibration characteristic measuring apparatus 1 of this embodiment is attached to a rotating machine like a multi-stage centrifugal compressor 50 and is capable of measuring vibration characteristics of a rotating body including a rotational shaft 51, a centrifugal impeller 53, etc. of the multi-stage centrifugal compressor 50.

The vibration characteristic measuring apparatus 1 of this embodiment can be applied to not only the multi-stage centrifugal compressor 50 but also a rotating machine (e.g., a turbine, or a motor) having a rotating body like the rotational shaft 51, but the following explanation will be given to an example case in which the vibration characteristic measuring apparatus 1 is attached to the multi-stage centrifugal compressor 50.

The multi-stage centrifugal compressor 50 employing the configuration shown in FIG. 1A successively compresses a compressible fluid like a gas by the centrifugal force of the centrifugal impeller 53 rotating together with the rotational shaft 51, and the rotational shaft 51 is rotated and driven by a drive source (e.g., a motor) (not shown).

The centrifugal impeller 53 is provided in the axial direction of the rotational shaft 51 in a multi-stage manner, rotates together with the rotational shaft 51, compresses the fluid suctioned from the center (at a side of the rotational shaft 51) and discharges the pressurized fluid from the outer periphery by the centrifugal force.

The rotational shaft 51 is supported by a plurality of bearing members in a freely rotatable manner. For example, the rotational shaft 51 is supported in the radial direction by bearing members 52a and 52b provided at two locations so as to hold the centrifugal impeller 53 therebetween in the axial direction. Also, a bearing member 52c that supports the rotational shaft 51 in the axial direction restricts the displacement of the rotational shaft 51 in the axial direction.

The rotational shaft 51 is supported by the plurality of bearing members 52a to 52c in a freely rotatable manner in this fashion.

The centrifugal impeller 53 is housed in a housing 54 that is a static body, and the centrifugal impeller 53 provided in the multi-stage manner compresses the fluid taken in from an inlet 54a and discharges the compressed fluid from an outlet 54b.

Hereinafter, a structure which includes the rotational shaft 51 and the centrifugal impeller 53, and which rotates together with the rotational shaft 51 is collectively referred to as a "rotating body" in some cases. Also, a structure (e.g., the housing 54) that stands still against the rotating body is collectively referred to as a "static body" in some cases.

According to the multi-stage centrifugal compressor 50 employing the above-explained configuration, when the fluid taken in from the inlet 54a of the housing 54 is discharged from the housing 54 without passing through the centrifugal impeller 53, the pressurized fluid is discharged from the outlet 54b in an uncompressed condition, and thus the compression efficiency of the multi-stage centrifugal compressor 50 decreases. Hence, in order to improve the compression efficiency, a sealing mechanism 55 that seals a space between the housing 54 (the static body) and the rotational shaft 51, the centrifugal impeller 53 (the rotating body) is provided as needed.

The sealing mechanism 55 is provided so as to seal the space between the housing 54 and the centrifugal impeller 53 in such a manner so as to prevent the pressurized fluid from, for example, flowing through the space between the centrifugal impeller 53 and the housing 54 from the inlet (the inlet—54a side) of the centrifugal impeller 53 to the outlet (the outlet—54b side) thereof.

Sealing mechanisms 55 that seal respective spaces between the housing 54 and the rotational shaft 51 are provided at both ends of the centrifugal impeller 53 in the axial direction.

The sealing mechanisms 55 provided as needed include a sealing member (not shown) that forms a minute clearance between the static body and the rotating body, and suppresses a flow of the pressurized fluid.

Also, by forming such a clearance, for example, the sealing member of the sealing mechanism 55 of the static body can be prevented from contacting the rotating body, and thus the worn-out of the sealing member is suppressed.

Note that FIG. 1 shows a configuration that the static body (the housing 54) has the sealing mechanisms 55, but the rotating body (the rotational shaft 51 and the centrifugal impeller 53, etc.) may have the sealing mechanisms 55. Also, the static body other than the housing 54 may have the sealing mechanisms 55.

The rotating body including the rotational shaft 51 and the centrifugal impeller 53, etc., has an uneven mass in the circumferential direction and produces minute vibration (unbalance vibration) at the time of rotating.

When the mass of the rotating body is uneven in the circumferential direction, as shown in FIG. 2A, the rotating body can be modeled so that a point in the circumferential direction becomes the concentrated point of the mass (a mass concentrated point G). When the rotating body having the mass concentrated point G rotates, the centrifugal force acts on the mass concentrated point G and the rotating body is pulled outwardly, and thus the rotating body displaces toward the mass concentrated point G. Such displacement successively occurs together with the rotation of the rotating body, and thus unbalance vibration occurs.

Magnets 12X, 12Y (see FIG. 2A) of the magnetic bearing 12 of the vibration characteristic measuring apparatus 1 (see FIG. 1A) are provided so as to generate a magnetic force on the rotational shaft 51 in a non-contact manner.

As explained above, since the rotating body produces unbalance vibration, the sealing mechanism 55 of the static body preferably has a clearance so as not to contact the rotating body when such unbalance vibration occurs. However, when the clearance becomes large, the sealing performance that suppresses the flow of the pressurized fluid decreases.

Hence, the unbalance vibration of the rotating body is always monitored and the operation of the rotating body is managed in some cases so that the amplitude of such unbalance vibration does not exceed a predetermined allowable value.

According to a rotating machine like the multi-stage centrifugal compressor 50 (see FIG. 1A), in order to evaluate the stability of the rotating body relative to the characteristic vibration mode, it is necessary to measure the vibration characteristics for measuring the response character of the lateral vibration produced at the rotating body as vibration characteristics.

The stability of the rotating body relative to the lateral vibration can be evaluated by applying vibration to the rotating body, and measuring the response characteristics of the vibration of the rotating body produced by the application of the vibration.

Hence, to evaluate the stability of the rotating body relative to the lateral vibration, the rotating body is forcibly vibrated, i.e., vibration is applied thereto, an amplitude and a phase of the vibration of the rotating body at this time are measured, and the response characteristics of an output (the actual vibration of the rotating body) relative to an input (the vibration applied to the rotating body) is measured.

As shown in FIG. 1A, the vibration characteristic measuring apparatus 1 according to this embodiment can be attached to the multi-stage centrifugal compressor 50, applies vibration to the rotating body in order to evaluate the stability of the rotating body relative to the lateral vibration, and measures the vibration (the amplitude and the phase) of the rotating body to which the vibration is applied, thereby measuring the response characteristics of the vibration.

Hence, the vibration characteristic measuring apparatus 1 includes the magnetic bearing 12 that applies vibration to the rotational shaft 51 and a measuring device (a displacement sensor 13) that measures the vibration amplitude (a displacement) of the rotational shaft 51.

The magnetic bearing 12 includes the magnets 12X, 12Y (see FIG. 1B), and has the primary function as a bearing to support the rotational shaft 51 in a non-contact manner by magnetic force generated by a current supplied to coils (not shown).

As shown in FIG. 1B, a Y axis is set in the vertical direction (a second direction) on a plane having the axial line of the rotational shaft 51 as a normal line and an X axis is set in a horizontal direction (a first direction) orthogonal to the Y axis. According to this setting, the X-axis direction (the first direction) is a direction orthogonal to the axial line direction of the rotational shaft 51 (the rotating body), and the Y-axis direction (the second direction) is a direction orthogonal to the axial line direction of the rotational shaft 51 and the X-axis direction (the first direction).

As shown in FIG. 1B, in a coordinate system having the rotational center of the rotational shaft 51 as an origin O, the magnetic bearing 12 has the magnets 12X disposed so as to hold the rotational shaft 51 therebetween in the horizontal direction over the X axis, and has the magnets 12Y disposed so as to hold the rotational shaft 51 therebetween in the vertical direction over the Y axis. The gap between the rotational shaft 51 and the magnet 12X can be adjusted by controlling a current supplied to the magnets 12X, and the gap between the rotational shaft 51 and the magnet 12Y can be adjusted by controlling a current supplied to the magnets 12Y.

Furthermore, by successively adjusting the gap between the rotational shaft 51 and the magnet 12X, the rotational shaft 51 can be vibrated in the X-axis direction, and by successively adjusting the gap between the rotational shaft 51 and the magnet 12Y, the rotational shaft 51 can be vibrated in the Y-axis direction. The magnetic bearing 12 can apply vibration to the rotational shaft 51 in this manner.

For example, when a cosine-wave current is supplied to the magnets 12X so as to periodically adjust the gap between the rotational shaft 51 and the magnet 12X, and a sine-wave current is supplied to the magnets 12Y so that the gap between the rotational shaft 51 and the magnet 12Y is adjusted to have the same period but the shifted phase by 90 degrees to the gap between the rotational shaft 51 and the magnet 12X, vibration can be applied to the rotational shaft 51 so as to vibrate in a circular motion around the axial line.

The displacement sensor 13 shown in FIG. 1A includes, for example, an X displacement sensor 13X that measures a displacement of the rotational shaft 51 in the X-axis direction caused by vibration and a Y displacement sensor 13Y that measures a displacement in the Y-axis direction, and the vibration displacement of the rotational shaft 51 can be measured based on the displacement in the X-axis direction and the displacement in the Y-axis direction. The kind of the displacement sensor 13 is not limited to any particular one, but an eddy current type that can measure the displacement of the rotational shaft 51 in, for example, a non-contact manner is available.

Conventionally, the vibration characteristic measuring apparatus 1 is configured to apply vibration to the rotational shaft 51 through the magnetic bearing 12 when the rotating body is, measure the displacement in the X-axis direction of the rotational shaft 51 and the displacement thereof in the Y-axis direction through the displacement sensor 13, and measure the vibration displacement of the rotational shaft 51.

At this time, since the rotating body is, the above-explained unbalance vibration occurs. Hence, when vibration is applied to the rotational shaft 51, in addition to the unbalance vibration, the vibration (hereinafter, referred to as forced vibration) due to the application of the vibration occurs, and the amplitude of the rotating body increases.

As explained above, in order to suppress a contact between the sealing mechanisms 55 of the static body and the rotating body, it is necessary that the vibration amplitude of the rotating body should be smaller than the predetermined allowable value. Hence, a vibration amplitude corresponding to the margin from the amplitude of the unbalance vibration to the allowable value can be input to the rotating body at which the unbalance vibration occurs.

Figure 2B:
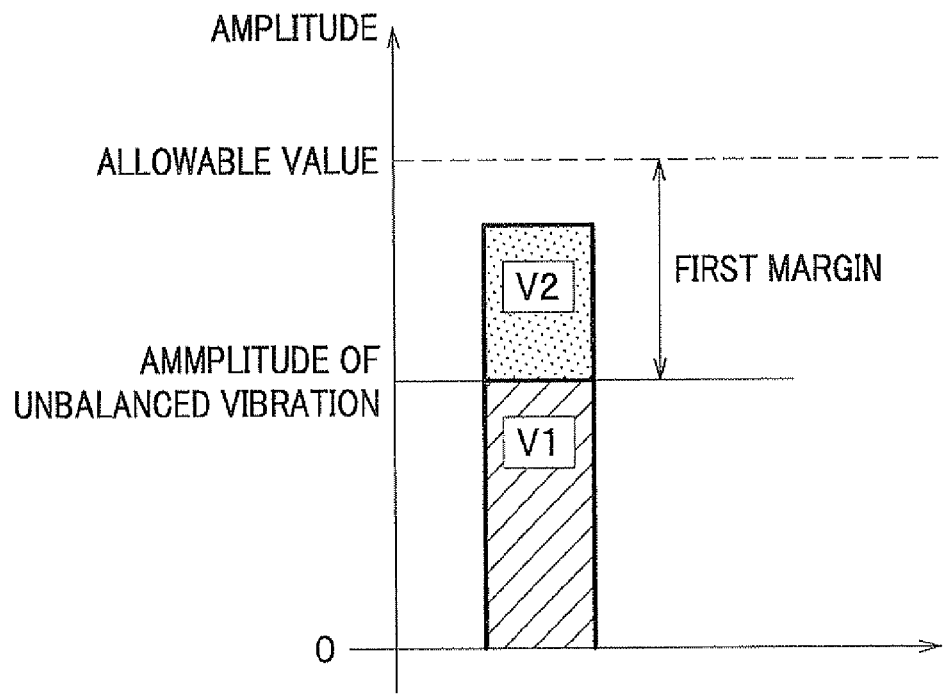
FIG. 2B is a diagram for explaining a margin from a vibration amplitude of the rotational shaft to an allowable value.

In other words, the magnitude of the forced vibration by application of vibration is restricted. That is, as shown in FIG. 2B, with reference to the amplitude of an unbalance vibration V1, it is necessary to suppress the amplitude of a forced vibration V2 within a range of a margin (a first margin) from the reference vibration amplitude to the allowable value.

Hence, the vibration amplitude of the rotational shaft 51 caused by the forced vibration becomes small, and the S/N ratio of the signal (a displacement signal) which indicates the displacement of the rotational shaft 51 and is output from the displacement sensor 13 becomes poor.

Therefore, the vibration characteristic measuring apparatus 1 of this embodiment applies vibration with a large amplitude to the rotational shaft 51, and attempts to maintain the good S/N ratio of the displacement signal output from the displacement sensor 13.

Figure 3:
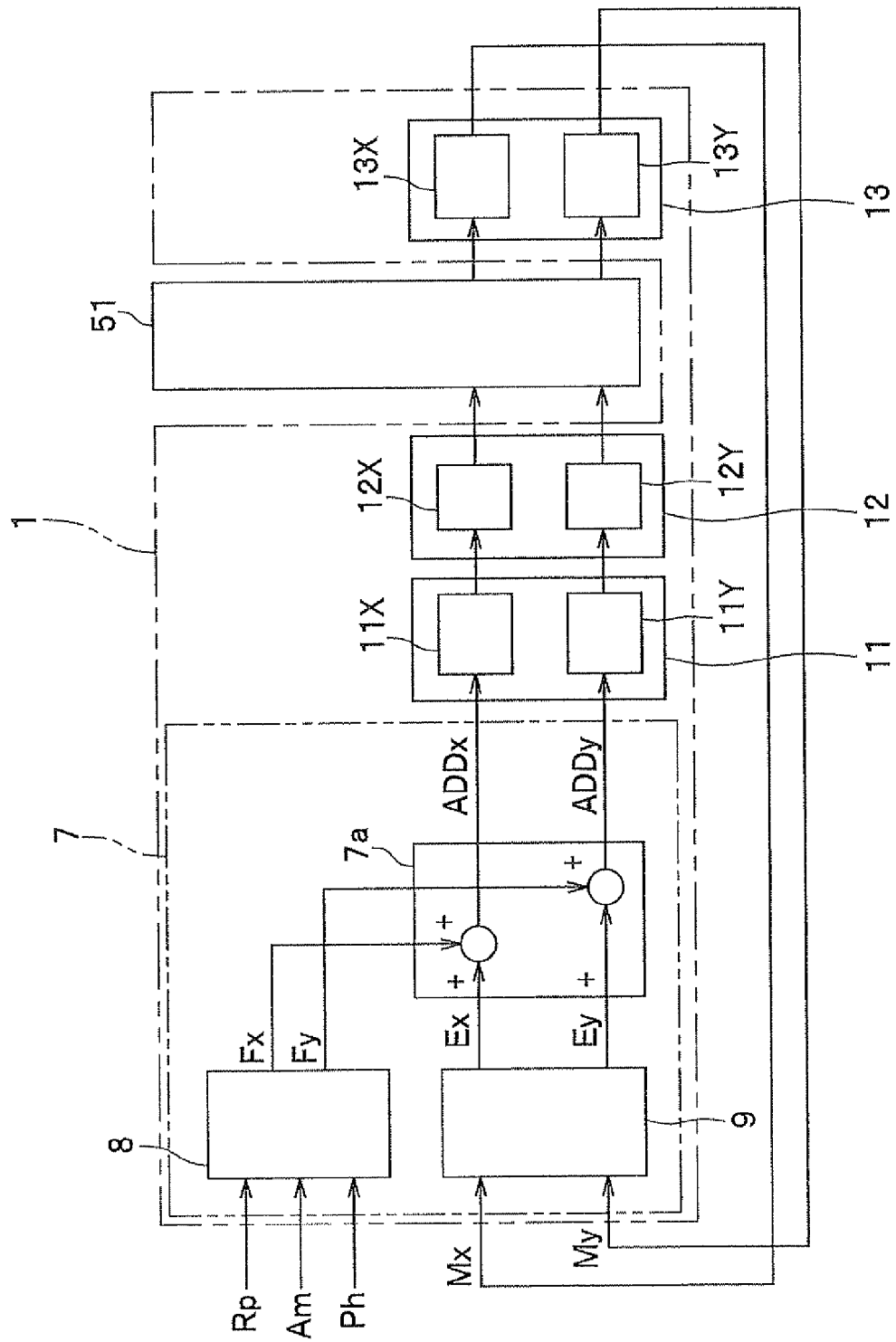
FIG. 3 is a diagram showing functional blocks of the vibration characteristic measuring apparatus.

More specifically, the vibration characteristic measuring apparatus 1 includes a balancing signal generator 8 as shown in FIG. 3, and attempts to temporarily eliminate the unbalance vibration at the time of measuring the response characteristics of the rotating body.

As shown in FIG. 2A, the balancing signal generator 8 successively generates forces for cancelling the centrifugal force acting on the mass concentrated point G by the magnetic force caused by the magnetic bearing 12 to cancel the displacement toward the mass concentrated point G caused by the centrifugal force, thereby eliminating the unbalance vibration of the rotating body.

As explained above, the vibration characteristic measuring apparatus 1 of this embodiment has a function of causing the balancing signal generator 8 shown in FIG. 3 to generate a signal for eliminating the unbalance vibration of the rotating body, and of inputting such a signal into a current amplifier 11 (see FIG. 3) that is a current supplier of this embodiment. The current amplifier 11 amplifies the input signal (the signal for eliminating the unbalance vibration) at a predetermined gain, and supplies the amplified signal to the magnetic bearing 12.

It is preferable that the current supplied to the magnetic bearing 12 from the current amplifier 11 should be a current having the input signal amplified by the predetermined gain and be synchronized with the input signal. According to this configuration, the magnetic bearing 12 to which the current is supplied from the current amplifier 11 can generate magnetic force in accordance with the signal input to the current amplifier 11.

The current supplier is not limited to the current amplifier 11 that supplies the current obtained by amplifying the input signal to the magnetic bearing 12 as long as it can supply a current for generating magnetic force in accordance with the input signal to the magnetic bearing 12.

The balancing signal generator 8 shown in FIG. 3 includes a so-called two-phase oscillator, and the oscillation frequency thereof needs to be synchronized with the rotation frequency of the rotating body. Hence, a rotation pulse signal Rp indicating the rotating speed of the rotating body is input into the balancing signal generator 8. For example, a configuration may be employed in which a rotating speed sensor (not shown) inputs, as the rotation pulse signal Rp, a result of measuring a rotation reference groove cut in the rotational shaft 51 to the balancing signal generator 8.

Also, the balancing signal generator 8 is built with a phase locked loop circuit (a PLL circuit) having the input rotation pulse signal Rp as a reference signal, and is configured to oscillate a sine wave signal and a cosine wave signal synchronized with the rotation frequency of the rotating body. The sine wave and the cosine wave oscillated by the PLL circuit are single frequency signals having phases which are different by 90 degrees each other.

Also, as shown in FIG. 3, a cancelling amplitude A and a phase Ph of the unbalance vibration are input into the balancing signal generator 8. The phase Ph is a phase between the rotation angle of the rotating body and rotation angle of the mass concentrated point G shown in FIG. 2A shifted by 180 degrees. That is, it is an angle (indicated by θb in FIG. 2A) delayed by 180 degrees from the rotation angle (indicated by θa in FIG. 2A) of the mass concentrated point G when the rotating body is at a reference position (e.g., rotation angle "0" degrees).

By setting the phase Ph delayed by 180 degrees from the rotation angle of the mass concentrated point G, it becomes possible to generate force in a direction for cancelling the centrifugal force acting on the mass concentrated point G.

Also, the cancelling amplitude Am indicates the level of cancelling the centrifugal force acting on the mass concentrated point G.

The cancelling amplitude Am and phase Ph can be obtained by, for example, an operator of the vibration characteristic measuring apparatus 1 (see FIG. 1A), who measures the unbalance vibration caused by the rotating body of the multi-stage centrifugal compressor 50 (see FIG. 1A), and can be input through an input device (not shown) as numeric values. Next, when a configuration is employed in which a memory unit (not shown) stores the input cancelling amplitude Am and phase Ph, the balancing signal generator 8 can read the cancelling amplitude Am and phase Ph as needed to use those pieces of data.

The balancing signal generator 8 combines the cancelling amplitude Am and phase Ph with the cosine wave signal and the sine wave signal oscillated by the PLL circuit, and generates, as indicated by the following formulae (1a) and (1b), an oscillation signal Fx in the X-axis direction and an oscillation signal Fy in the Y-axis direction as shown in FIG. 2A.

$$Fx = Am \cdot \cos(\Omega t + Ph) \quad (1a)$$

$$Fy = Am \cdot \sin(\Omega t + Ph) \quad (1b)$$

where $\Omega$ is the rotation angle speed of the rotating body and t is a time.

Also, the rotation angle speed $\Omega$ is a value calculated based on, for example, the input rotation pulse signal Rp.

The balancing signal generator 8 generates the oscillation signals Fx and Fy both having the amplitudes Am but the phases shifted by 90 degrees from each other in this manner.

In this fashion, the balancing signal generator 8 generates the oscillation signal Fx in the X-axis direction containing the cosine wave component (Am·Cos($\Omega$t+Ph)) and the oscillation signal Fy in the Y-axis direction containing the sine wave component (Am·Sin($\Omega$t+Ph)).

The oscillation signals Fx and Fy indicated by the formulae (1a) and (1b) are output from the balancing signal generator 8, and are input into an X amplifier 11X and a Y amplifier 11Y, respectively, of the current amplifier 11.

The X amplifier 11X amplifies the input oscillation signal Fx at a predetermined gain, and supplies the amplified signal to the magnets 12X. Also, the Y amplifier 11Y amplifies the input oscillation signal Fy at a predetermined gain (e.g., the same gain as that of the X amplifier 11X), and supplies the amplified signal to the magnets 12Y. The gains of the X amplifier 11X and the Y amplifier 11Y are preferably set depending on the characteristics of the magnetic bearing 12 and the vibration characteristics of the rotating body, respectively.

When the currents output from the current amplifier 11 (the X amplifier 11X and the Y amplifier 11Y) are supplied to the magnets 12X and the magnets 12Y, the currents having a signal (a synthesized oscillation signal Fz) synthesized in the X-axis direction and the Y-axis direction and amplified are supplied to the magnetic bearing 12. The synthesized oscillation signal Fz can be expressed by the following formula (2) using the complex number representation.

$$Fz = Fx + jFy = Am \cdot e^{j(\Omega t + Ph)} \quad (2)$$

where j is an imaginary number unit.

It is clear from the formula (2) that the synthesized oscillation signal Fz is a signal oscillating circularly with a radius of Am over a complex plane together with the advancement of the time t. Hence, when the magnets 12X and 12Y disposed around the rotating body by the magnetic bearing 12 and orthogonal to one another generate respective magnetic forces in accordance with the oscillation signals Fx and Fy, the synthesized magnetic force is synchronized with the rotation of the rotating body and oscillates circularly around the rotation center of the rotating body.

Also, the force (hereinafter, referred to as unbalance force), which is generated by the unbalance vibration and displaces the rotating body, also oscillates circularly around the rotation center of the rotating body in synchronization with the rotation of the rotating body. The unbalance force is generated by the centrifugal force acting on the mass concentrated point G shown in FIG. 2A, and the phases Ph of the oscillation signals Fx and Fy correspond to an angle delayed by 180 degrees from the rotation angle of the mass concentrated point G. Accordingly, the unbalance vibration of the rotating body can be eliminated by the magnetic force generated by the magnetic bearing 12 to which the cosine wave current and the sine wave current generated by amplifying the oscillation signals Fx and Fy are supplied.

That is, the synthesized oscillation signal Fz is a vibration eliminating signal containing the cosine wave component (Am·Cos(Ωt+Ph)) as a component for eliminating the vibration in the X-axis direction and the sine wave component (Am·Sin(Ωt+Ph)) as a component for eliminating the vibration in the Y-axis direction.

The balancing signal generator 8 generates the oscillation signals Fx and Fy in this manner, and further generates the synthesized oscillation signal (the vibration eliminating signal) Fz by synthesizing the oscillation signals Fx and Fy, thereby eliminating the unbalance vibration of the rotating body.

Also, the vibration characteristic measuring apparatus 1 includes an excitation response analyzer 9 shown in FIG. 3. The excitation response analyzer 9 generates excitation signals Ex and Ey for applying vibrations to the rotating body. The excitation signal Ex is a signal to apply vibration to the rotating body in the X-axis direction, and the excitation signal Ey is a signal to apply vibration to the rotating body in the Y-axis direction. A signal containing at least one of the excitation signals Ex and Ey as a component is referred to as an excitation control signal.

According to this configuration, the excitation signal Ex is a component (a first direction excitation component) of the excitation control signal that applies vibration to the rotating body in the X-axis direction, and the excitation signal Ey is a component (a second direction excitation component) of the excitation control signal that applies vibration to the rotating body in the Y-axis direction.

The excitation response analyzer 9 of this embodiment outputs, for example, sine wave signals with arbitrary amplitudes as the excitation signal Ex in the X-axis direction and the excitation signal Ey in the Y-axis direction while changing the periods, and inputs those signals into the X amplifier 11X and the Y amplifier 11Y of the current amplifier 11, respectively.

When a current obtained by amplifying the excitation signal Ex that is the sine wave signal by the X amplifier 11X is supplied to the magnets 12X, vibration is applied to the rotating body in the X-axis direction. Also, when a current obtained by amplifying the excitation signal Ey that is the sine wave signal by the Y amplifier 11Y is supplied to the magnets 12Y, vibration is applied to the rotating body in the Y-axis direction.

Also, a displacement signal indicating the displacement of the rotating body measured by the displacement sensor 13 is input into the excitation response analyzer 9. The X displacement sensor 13X measures the displacement of the rotating body in the X-axis direction, and inputs, as an X displacement signal Mx, the measurement result into the excitation response analyzer 9, and the Y displacement sensor 13Y measures the displacement of the rotating body in the Y-axis direction and inputs, as a Y displacement signal My, the measurement result into the excitation response analyzer 9.

When the excitation signal Ex in the X-axis direction is a sine wave signal, the excitation response analyzer 9 outputs the excitation signal Ex while changing the period along with the advancement of the time, and obtains data on the displacement of the rotating body in the X-axis direction based on the X displacement signal Mx input into the excitation response analyzer 9. Thereafter, the response characteristics (the frequency characteristics) of the rotating body in the X-axis direction relative to the excitation signal Ex (the sine wave signal) is measured.

Likewise, when the excitation signal Ey in the Y-axis direction is a sine wave signal, the excitation response analyzer 9 outputs the excitation signal Ey while changing the period along with the advancement of the time, and obtains data on the displacement of the rotating body in the Y-axis direction based on the Y displacement signal My input into the excitation response analyzer 9. Thereafter, the response characteristics (the frequency characteristics) of the rotating body in the Y-axis direction relative to the excitation signal Ey (the sine wave signal) is measured.

In this fashion, the excitation response analyzer 9 measures the response characteristics of the output (the X displacement signal Mx and the Y displacement signal My) of the rotating body relative to the input (the excitation signal Ex in the X-axis direction and the excitation signal Ey in the Y-axis direction) to the rotating body.

Figure 4A:
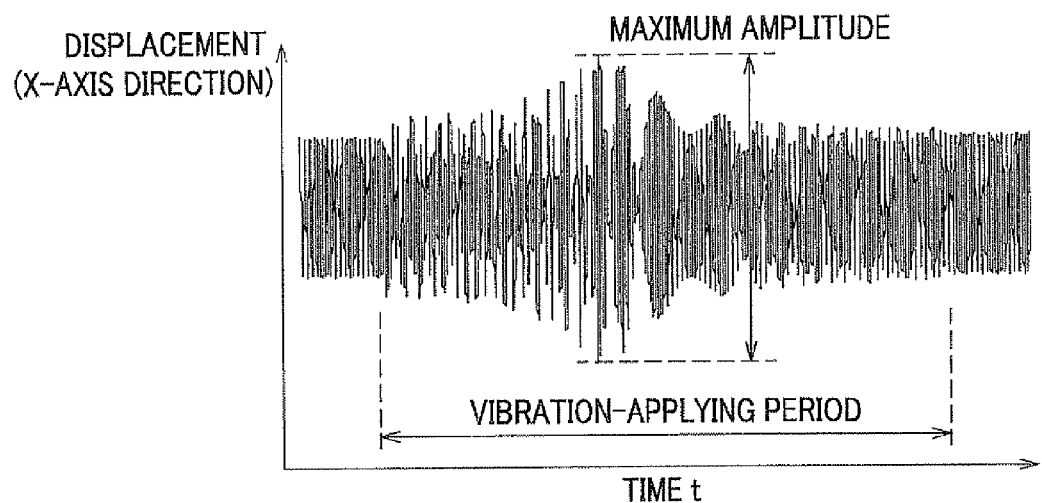
FIG. 4A is a diagram showing a vibration amplitude in an X-axis direction of a rotational shaft when a vibration is applied by a conventional vibration characteristic measuring apparatus.

For example, as shown in FIG. 4A, in order to measure the response characteristics in the X-axis direction, when the excitation response analyzer 9 applies vibration to the rotating body in the X-axis direction, while vibration is applied (during an excitation period), the displacement in the X-axis direction, i.e., the amplitude changes in accordance with the change in the period of the excitation signal Ex in the X-axis direction, and the response characteristics which becomes the maximum amplitude at a specific frequency can be obtained.

However, since the unbalance vibration is generated by the rotating body while vibration is applied, the amplitude of the forced vibration caused by the excitation is superimposed on the amplitude of the unbalance vibration. Also, the vibration amplitude of the rotating body subjected to the forced vibration becomes larger than that of the rotating body to which no vibration is applied. Hence, the vibration amplitude that can be produced at the rotating body by the excitation is restricted within the range of the first margin from the amplitude of the unbalance vibration to the allowable value as shown in FIG. 2B (again shown in FIG. 5 as (conventional example)).

Figure 5:
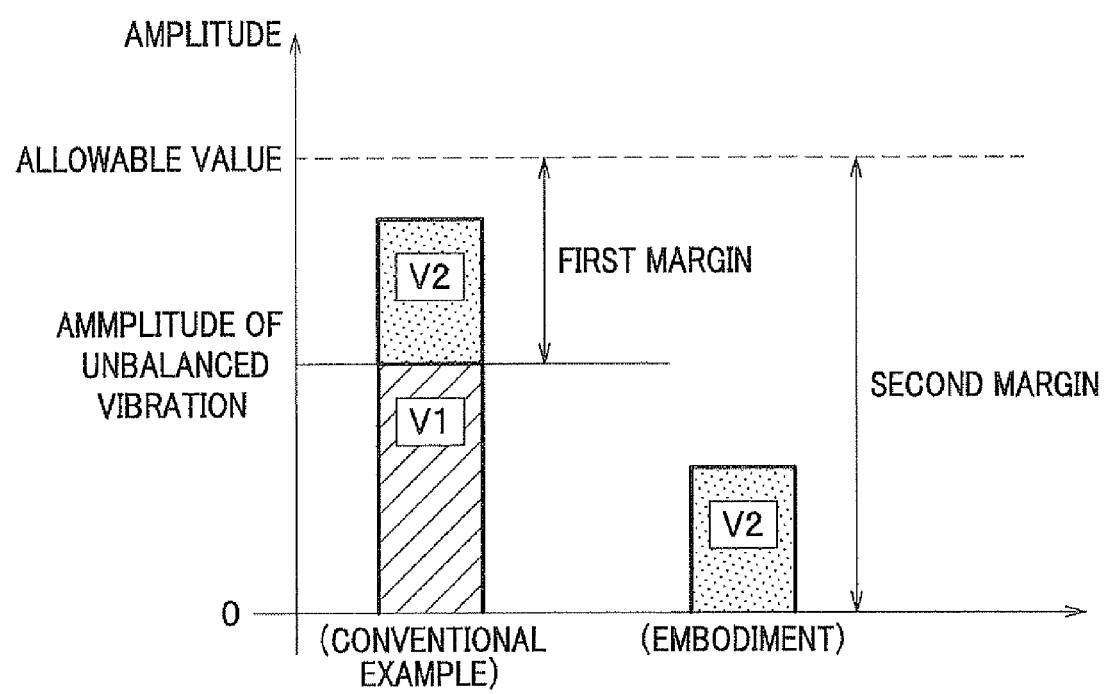
FIG. 5 is a diagram for comparing a margin from a vibration amplitude of a rotational shaft to an allowable value of this embodiment with that of a prior art.

That is, as is shown by (conventional example) in FIG. 5, with reference to the amplitude of an unbalance vibration V1, the amplitude of a forced vibration V2 appears as the increase from the reference vibration amplitude. Hence, the amplitude of the forced vibration V2 is limited to the amplitude corresponding to the first margin from the reference vibration amplitude (the amplitude of the unbalance vibration V1) to the allowable value. This restricts the vibration amplitude generated by applying vibration to the rotating body to be small. That is, it is limited in such a way that the maximum amplitude of the forced vibration V2 becomes small and the S/N ratio of the X displacement signal Mx output from the X displacement sensor 13X measuring the maximum amplitude becomes poor. Accordingly, the quality of the data on the displacement in the X-axis direction obtained by the excitation response analyzer 9 becomes poor. The quality of data on the displacement in the Y-axis direction becomes also poor.

Hence, the vibration characteristic measuring apparatus 1 (see FIG. 1A) includes, as shown in FIG. 3, an adder 7a which adds the oscillation signal Fx to the excitation signal Ex, and adds the oscillation signal Fy to the excitation signal Ey. According to this embodiment, the balancing signal generator 8, the excitation response analyzer 9, and the adder 7a function are included as an excitation controller 7 of the vibration characteristic measuring apparatus 1.

When measuring the response characteristics of the rotating body, the vibration characteristic measuring apparatus 1 causes the excitation response analyzer 9 of the excitation controller 7 to generate the excitation control signal, and causes the balancing signal generator 8 to generate the vibration eliminating signal. Also, the adder 7a generates an addition signal ADDx obtained by adding the oscillation signal Fx in the X-axis direction of the vibration eliminating signal to the excitation signal Ex in the X-axis direction of the excitation control signal. Likewise, the adder 7a generates an addition signal ADDy obtained by adding the oscillation signal Fy in the Y-axis direction of the vibration eliminating signal to the excitation signal Ey in the Y-axis direction of the excitation control signal.

The addition signal ADDx is input into the X amplifier 11X, and a current that is the addition signal ADDx amplified by the X amplifier 11X is supplied to the magnets 12X (see FIG. 1B) of the magnetic bearing 12.

Also, the addition signal ADDy is input into the Y amplifier 11Y, and a current that is the addition signal ADDy amplified by the Y amplifier 11Y is supplied to the magnets 12Y (see FIG. 1B) of the magnetic bearing 12.

That is, the excitation controller 7 outputs a signal (hereinafter, referred to as a rotating body control signal) obtained by adding the vibration eliminating signal (the synthesized oscillation signal Fz) to the excitation control signal.

The rotating body control signal is a synthesized signal containing the addition signal ADDx which contains a component obtained by adding the cosine wave component of the vibration eliminating signal to the first direction excitation component of the excitation control signal, and the addition signal ADDy which contains a component obtained by adding the sine wave component of the vibration eliminating signal to the second direction excitation component of the excitation control signal.

The addition signal ADDx is obtained by adding the oscillation signal Fx in the X-axis direction to the excitation signal Ex, and contains the component of the oscillation signal Fx in the X-axis direction of the rotating body, and the component of the excitation signal Ex in the X-axis direction.

Also, the addition signal ADDy is obtained by adding the oscillation signal Fy in the Y-axis direction to the excitation signal Ey, and contains the component of the oscillation signal Fy in the Y-axis direction of the rotating body and the component of the excitation signal Ey in the Y-axis direction.

Hence, the rotating body control signal containing the addition signals ADDx and ADDy as components is a signal containing a component of the oscillation signal Fx in the X-axis direction, a component of the oscillation signal Fy in the Y-axis direction, a component of the excitation signal Ex in the X-axis direction, and a component of the excitation signal Ey in the Y-axis direction. When a current having the rotating body control signal amplified by the current amplifier 11 is supplied to the magnetic bearing 12, a current containing the component of the oscillation signal Fx in the X-axis direction, the component of the oscillation signal Fy in the Y-axis direction, the component of the excitation signal Ex in the X-axis direction, and the component of the excitation signal Ey in the Y-axis direction is supplied to the magnetic bearing 12.

Figure 4B:
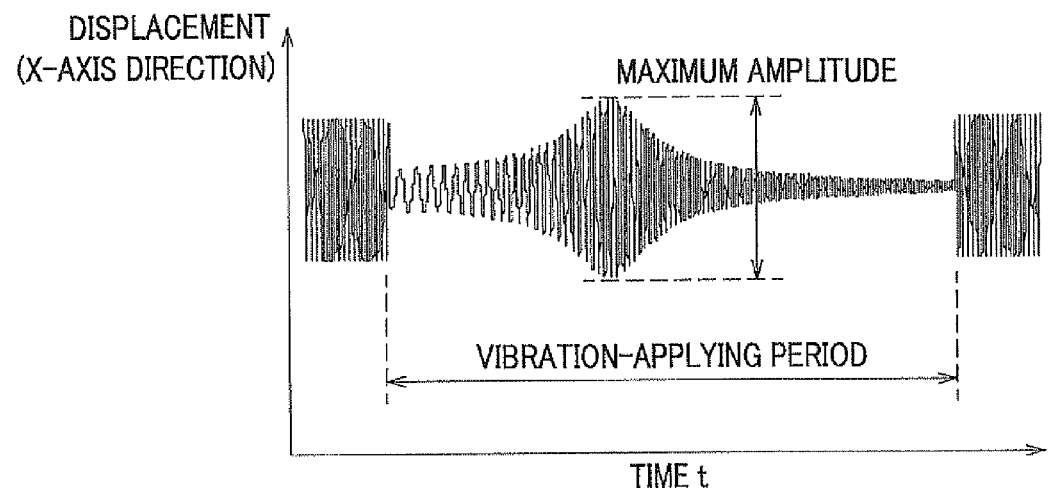
FIG. 4B is a diagram showing a vibration amplitude in an X-axis direction of a rotational shaft when a vibration is applied by the vibration characteristic measuring apparatus of this embodiment.

According to this configuration, during an excitation period, the unbalance vibration of the rotating body is eliminated by the components of the oscillation signals Fx and Fy in the current supplied to the magnetic bearing 12, and vibrations are applied to the rotating body in the X-axis direction and the Y-axis direction by the components of the excitation signals Ex and Ey. Hence, as shown in FIG. 4B, no unbalance vibration occurs in the X-axis direction during the excitation period, and only the forced vibration by caused the application of vibrations occurs. The vibration amplitude of the rotating body in the X-axis direction becomes that of the forced vibration. Also, it is not illustrated in the figure but no unbalance vibration in the Y-axis direction occurs, and only the forced vibration caused by the application of vibrations occurs. The vibration amplitude of the rotating body in the Y-axis direction becomes that of the forced vibration.

Hence, the X displacement sensor 13X (see FIG. 3) measures only the amplitude of the forced vibration in the X-axis direction, and inputs, as the X displacement signal Mx (see FIG. 3), the measurement result into the excitation response analyzer 9 (see FIG. 3). Likewise, the Y displacement sensor 13Y (see FIG. 3) measures only the amplitude of the forced vibration in the Y-axis direction, and inputs, as the Y displacement signal My (see FIG. 3), the measurement result into the excitation response analyzer 9 (see FIG. 3).

That is, as is indicated as "embodiment" in FIG. 5, a condition in which no amplitude of the unbalance vibration is present, i.e., a condition that the amplitude is "0" can be a reference, and the amplitude of the forced vibration V2 appears as the increase from "0". Hence, it is appropriate if the amplitude of the forced vibration V2 is within a range of an amplitude corresponding to a margin (the second margin) from "0" to the allowable value, and thus the range of the vibration amplitude generated by applying vibration to the rotating body can be extended. Also, the maximum amplitude of the forced vibration V2 can be extended up to a vibration amplitude corresponding to the second margin from "0" to the allowable value, and thus the X displacement sensor 13X (see FIG. 3) measuring the maximum amplitude can output the X displacement signal Mx (see FIG. 3) with a good S/N ratio. Likewise, the Y displacement sensor 13Y (see FIG. 3) measuring the maximum amplitude can output the Y displacement signal My (see FIG. 3) with a good S/N ratio.

Accordingly, the quality of the data on the displacement in the X-axis direction and that of data on the displacement in the Y-axis direction both obtained by the excitation response analyzer 9 can be improved.

The vibration characteristic measuring apparatus 1 can employ a configuration of measuring independently the response characteristics of the rotating body of the multistage centrifugal compressor 50 (see FIG. 1A) in the X-axis direction and the response characteristics in the Y-axis direction.

For example, when the response characteristics in the X-axis direction is independently measured, the excitation response analyzer 9 inputs the addition signal ADDx obtained by adding the oscillation signal Fx in the X-axis direction output from the balancing signal generator 8 and the excitation signal Ex in the X-axis direction output from the excitation response analyzer 9 to the X amplifier 11X.

Also, the oscillation signal Fy in the Y-axis direction output from the balancing signal generator 8 is input into the Y amplifier 11Y. That is, the addition signal ADDy that nulls the excitation signal Ey in the Y-axis direction is input into the Y amplifier 11Y.

At this time, a current containing the component of the oscillation signal Fx in the X-axis direction, the component of the oscillation signal Fy in the Y-axis direction, and the component of the excitation signal Ex in the X-axis direction is supplied to the magnetic bearing 12.

Next, the X displacement sensor 13X (see FIG. 3) measures the displacement of the rotating body in the X-axis direction, and inputs the X displacement signal Mx (see FIG. 3) into the excitation response analyzer 9 (see FIG. 3).

The rotating body has the unbalance vibration in the X-axis direction eliminated by the component of the oscillation signal Fx in the X-axis direction in the current supplied to the magnetic bearing 12, and the X displacement sensor 13X becomes able to measure the vibration amplitude of the rotating body vibrated by the application of vibration.

Likewise, the excitation response analyzer 9 inputs the addition signal ADDy obtained by adding the oscillation signal Fy in the Y-axis direction output from the balancing signal generator 8 to the excitation signal Ey in the Y-axis direction output from the excitation response analyzer 9 into the Y amplifier 11Y. Also, the addition signal ADDx that nulls the excitation signal Ex in the X-axis direction is input into the X amplifier 11X. This makes it possible for the Y displacement sensor 13Y (see FIG. 3) to measure the displacement of the rotating body in the Y-axis direction.

The rotating body has the unbalance vibration in the Y-axis direction eliminated by the component of the oscillation signal Fy in the Y-axis direction in the current supplied to the magnetic bearing 12, and the Y displacement sensor 13Y becomes able to measure the vibration amplitude of the rotating body vibrated by the application of vibration.

As explained above, a configuration may be employed which independently measure the response characteristics of the rotating body in the X-axis direction and the response characteristics in the Y-axis direction.

As explained above, according to the vibration characteristic measuring apparatus 1 (see FIG. 1A) of this embodiment, when the response characteristics of the rotating body (the rotational shaft 51 (see FIG. 1A) and the centrifugal impeller 53 (see FIG. 1A)) of the multi-stage centrifugal compressor 50 (see FIG. 1A) are measured, the oscillation signals Fx and Fy generated by the balancing signal generator 8 (see FIG. 3) are added to the excitation signals Ex and Ey generated by the excitation response analyzer 9 (see FIG. 3) by the adder 7a (see FIG. 3), and the addition signal ADDx (see FIG. 3) containing the component of the oscillation signal Fx in the X-axis direction and the component of the excitation signal Ex in the X-axis direction, and the addition signal ADDy (see FIG. 3) containing the component of the oscillation signal Fy in the Y-axis direction and the component of the excitation signal Ey in the Y-axis direction are generated.

The addition signals ADDx and ADDy are input into the current amplifier 11 (the X amplifier 11X (see FIG. 3) and the Y amplifier 11Y (see FIG. 3)) as the output signals by the excitation controller 7 (see FIG. 3).

The X amplifier 11X supplies the current obtained by amplifying the addition signal ADDx into the magnets 12X (see FIG. 3) of the magnetic bearing 12, and the Y amplifier 11Y supplies the current obtained by amplifying the addition signal ADDy into the magnets 12Y (see FIG. 3) of the magnetic bearing 12.

The rotating body has the unbalance vibration eliminated by the component of the oscillation signal Fx in the X-axis direction contained in the current supplied to the magnets 12X (see FIG. 3), and the component of the oscillation signal Fy in the Y-axis direction contained in the current supplied to the magnets 12Y (see FIG. 3). Also, vibrations are applied by the component of the excitation signal Ex in the X-axis direction contained in the current supplied to the magnets 12X and the component of the excitation signal Ey in the Y-axis direction contained in the current supplied to the magnets 12Y.

According to this configuration, when the vibration characteristic measuring apparatus 1 (see FIG. 1A) measures the response characteristics of the rotating body of the multi-stage centrifugal compressor 50 (see FIG. 1A), it becomes possible to eliminate the unbalance vibration of the rotating body. This makes the allowable range of the amplitude of the forced vibration by the excitation expanded, thereby improving respective S/N ratios of the X displacement signal Mx and the Y displacement signal My output from the displacement sensor 13 (the X displacement sensor 13X (see FIG. 3) and the Y displacement sensor 13Y (see FIG. 3)). Also, the excitation response analyzer 9 (see FIG. 3) becomes able to obtain high-quality data on the displacement in the X-axis direction and high-quality data on the displacement in the Y-axis direction.

Furthermore, since the quality of obtained data is high and the response characteristics of the rotating body can be evaluated with little data, the time necessary for obtaining pieces of data can be reduced. Also, the number of processes to obtain pieces of data can be reduced, and thus reducing the energy consumption.

The excitation signals Ex and Ey may be, for example, random signals and pulse signals instead of the above-explained sine wave signals.

When the excitation response analyzer 9 generates an excitation signal other than the sine wave signal, a configuration can be employed in which the rotating body control signal obtained by adding the component of the excitation signal (the first direction excitation component and the second direction excitation component) to the component (a cosine wave component and a sine wave component) of the oscillation signal is amplified by the current amplifier 11 (see FIG. 3) and the obtained current is supplied to the magnetic bearing 12 (see FIG. 3).

Also, in order to evaluate the stability of the rotating body, there is a technique for analyzing the vibration waveform of the rotating body and identifying a system parameter. For example, vibration is applied to the rotating body by the excitation signal containing the sine wave component of a frequency causing the rotating body to generate vibration at a natural frequency, and the excitation signal is instantaneously cut off when the rotating body is in a resonant condition to identify the system parameter based on a free vibration waveform (regarding the detail of the system identification, see, for example, Shuichi ADACHI, "System Identification for a Control based on MATLAB", 1996, Tokyo Denki University Press).

In the case of the technique for identifying the system parameter in this fashion, a current obtained by amplifying, by the current amplifier 11 (see FIG. 3), the rotating body control signal obtained by adding the excitation signal which causes the rotating body to vibrate at a natural frequency to the oscillation signal can supplied to the magnetic bearing 12 (see FIG. 3). Also, after the excitation signal is cut off, while the rotating body is freely vibrating, when the currents obtained by amplifying the oscillation signals Fx and Fy by the current amplifier 11 are supplied to the magnetic bearing 12, the displacement sensor 13 (see FIG. 3) can measure the displacement of the rotating body freely vibrating without being affected by the unbalance vibration.

Figure 6:
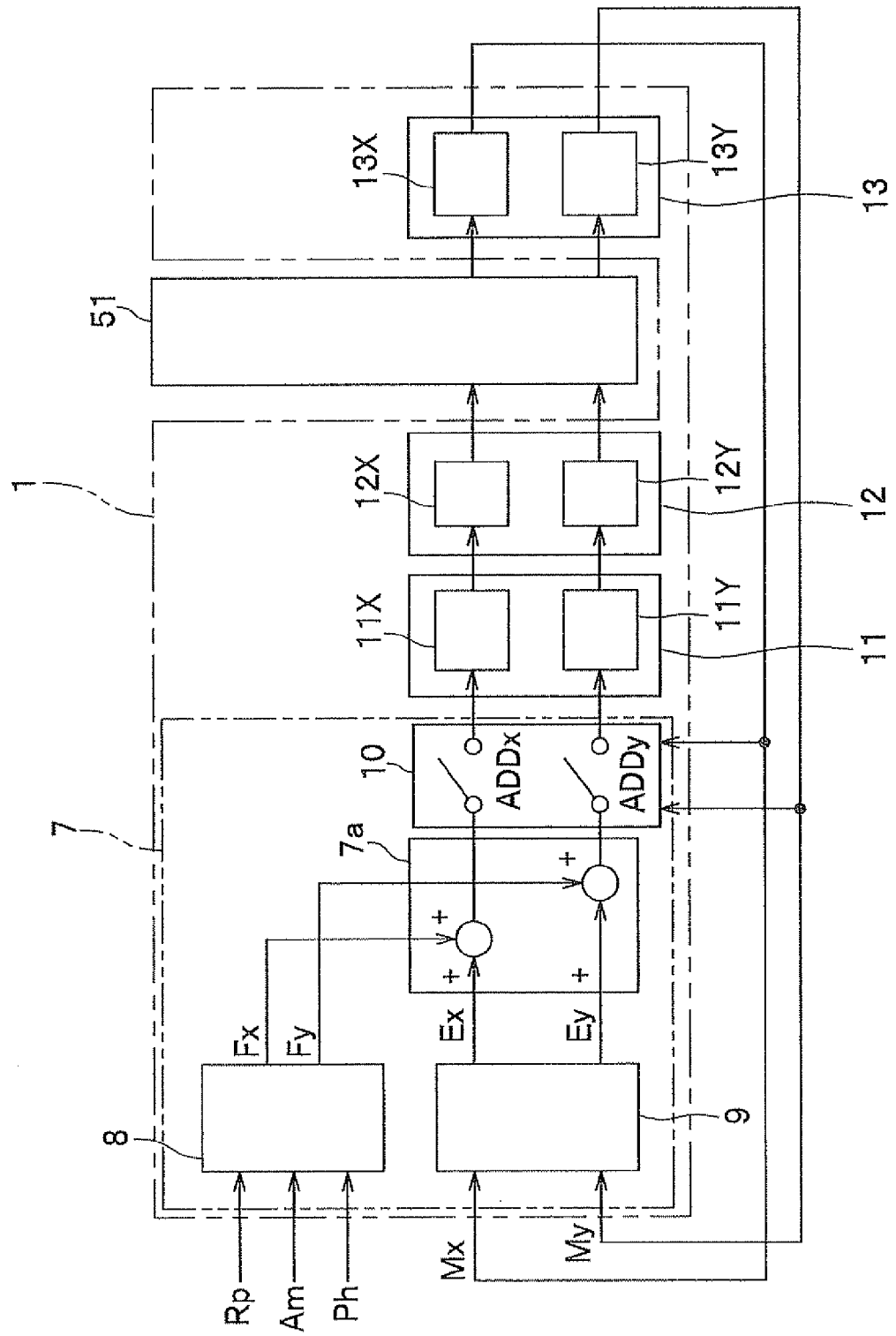
FIG. 6 is a functional block diagram of a vibration characteristic measuring apparatus provided with an applied-vibration control device having an applied-vibration signal breaker.

As an example of the modified vibration characteristic measuring apparatus 1, for example, as shown in FIG. 6, the excitation controller 7 having an excitation signal cutoff device 10 that cuts off respective outputs of the addition signals ADDx and ADDy output from the adder 7a may be employed.

The X displacement signal Mx output from the X displacement sensor 13X and the Y displacement signal My output from the Y displacement sensor 13Y are input into the excitation signal cutoff device 10.

The excitation signal cutoff device 10 is configured to cut off the output of the addition signals ADDx and ADDy when at least one of the displacement of the rotating body in the X-axis direction calculated based on the X displacement signal Mx and the displacement of the rotating body in the Y-axis direction calculated based on the Y displacement signal My exceeds a predetermined threshold.

According to this configuration, for example, when the displacement in the X-axis direction or the displacement in the Y-axis direction exceeds the predetermined threshold by the excitation by respective components of the excitation signals Ex and Ey in the addition signals ADDx and ADDy, i.e., the vibration amplitude of the rotating body exceeds the allowable value, the supply of the currents those are the addition signals ADDx and ADDy amplified by the current amplifier 11 to the magnetic bearing 12 is cut off. Hence, the vibration the rotating body can be converged at the amplitude exceeding the allowable value, and for example, it is possible to prevent the sealing mechanisms 55 (see FIG. 1A) from being damaged.

It is not illustrated in the figure but if the excitation signal cutoff device 10 is disposed between the excitation response analyzer 9 and the adder 7a, when the vibration amplitude of the rotating body exceeds the allowable value, the input of the excitation signals Ex and Ey output from the excitation response analyzer 9 into the adder 7a can be cut off. Hence, only the oscillation signals Fx and Fy are output from the excitation controller 7, and currents those are the oscillation signals Fx and Fy amplified by the current amplifier 11 are supplied to the magnetic bearing 12.

According to this configuration, the vibration at the amplitude exceeding the allowable value and generated by the rotating body can be further rapidly converged.

What is claimed is:

1. An apparatus for measuring vibration characteristics, comprising:
    a magnetic bearing that generates a magnetic force on a rotating body of a rotating machine in a non-contact manner;
    a measuring device that measures a vibration when the rotating body is vibrated;
    a current supplier that supplies a current to the magnetic bearing; and
    an excitation controller which outputs an excitation control signal for controlling the magnetic bearing to apply vibration to the rotating body, and which measures a response characteristics of the vibration of the rotating body to the excitation control signal based on the vibration measured by the measuring device, wherein
    the excitation controller
    takes a cosine wave component of which phase delays by 180 degrees with respect to a rotation of a mass concentrated point at a same period as a rotation period of the rotating body as a component for eliminating vibration of the rotating body in a first direction orthogonal to a direction of an axial line of the rotating body,
    generates a vibration eliminating signal containing a sine wave component of which phase delays by 180 degrees with respect to the rotation of the mass concentrated point at the same period as the rotation period of the rotating body as a component for eliminating vibration of the rotating body in a second direction orthogonal to the axial line direction and the first direction,
    generates the excitation control signal containing a first direction excitation component for applying vibration to the rotating body in the first direction and a second direction excitation component for applying vibration to the rotating body in the second direction, and
    generates and outputs a rotating body control signal by adding the cosine wave component to the first direction excitation component and adding the sine wave component to the second direction excitation component, and wherein
    the current supplier supplies a current that generates magnetic force in accordance with the rotating body control signal to the magnetic bearing, and sets the vibration eliminating signal corresponding to a size of a mass at the mass concentrated point and a phase of the mass concentrated point when the rotating body is modeled, when the excitation controller measures the response characteristics to eliminate unbalance vibration generated by the magnetic bearing during a rotation of the rotating body.

2. The apparatus according to claim 1, wherein the excitation controller comprises an excitation signal cutoff device that cuts off an output of the rotating body control signal when the vibration amplitude measured by the measuring device exceeds a predetermined allowable value.

3. A method for measuring vibration characteristics executed by a vibration characteristic measuring apparatus, the apparatus including:
    a magnetic bearing that generates a magnetic force on a rotating body of a rotating machine in a non-contact manner;
    a measuring device that measures an vibration when the rotating body is vibrated; and
    an excitation controller which outputs an excitation control signal for controlling the magnetic bearing to apply vibration to the rotating body and a vibration eliminating signal for eliminating unbalance vibration generated when the rotating body rotates, and which measures a response characteristics of the vibration of the rotating body to the excitation control signal based on the vibration measured by the measuring device,
    the method comprising steps of:
    generating the vibration eliminating signal to synthesizing a cosine wave component of which phase delays by 180 degrees with respect to a rotation of a mass concentrated point when the rotating body is modeled with a sine wave component of which phase delays by 180 degrees with respect to the rotation of the mass concentrated point when the rotating body is modeled at a same period as a rotation period of the rotating body;
    adding the excitation control signal to the vibration eliminating signal to generate a rotating body control signal; and
    measuring the vibration when a current that generates magnetic force in response to the rotating body control signal is supplied to the magnetic bearing.

* * * * *